March 25, 1952     W. L. WEAKLEND     2,590,664
SEAT COVER
Filed June 23, 1948
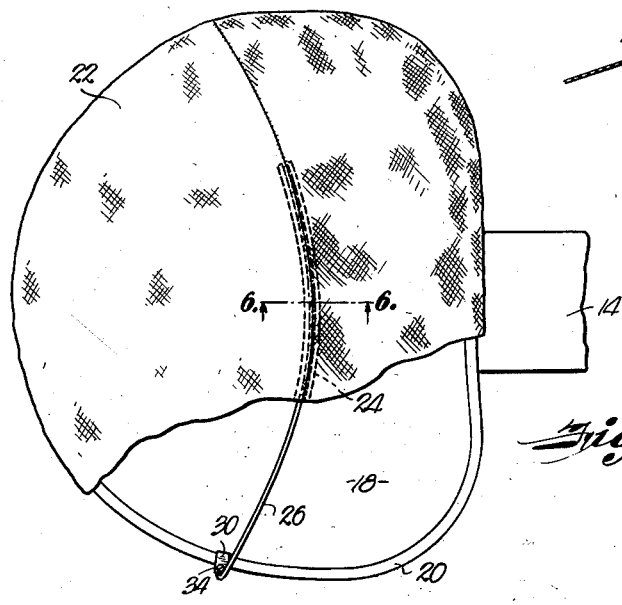
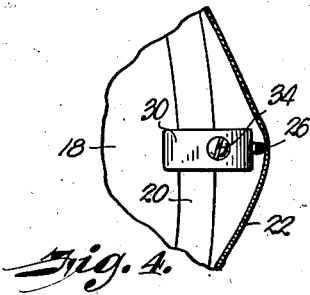
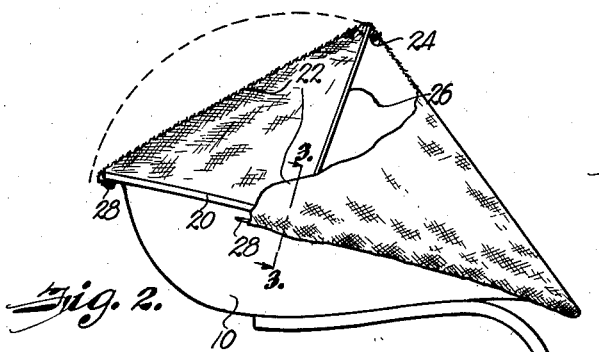
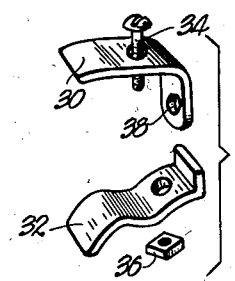
INVENTOR.
Walter L. Weaklend
BY
Thos. E. Scofield
ATTORNEY.

Patented Mar. 25, 1952

2,590,664

UNITED STATES PATENT OFFICE 2,590,664

SEAT COVER

Walter L. Weaklend, Platte City, Mo., assignor to Rockledge Manufacturing Company, a corporation of Missouri Application June 23, 1948, Serial No. 34,624

9 Claims. (Cl. 155—182)

The present invention relates in general to seats for outdoor vehicles such as tractors or motor cycles, and it deals more particularly with means for sheltering the seats when they are unoccupied.

Customarily seats of this type are exposed to all kinds of weather, and in the past they usually have been designed more with a view to standing up under such exposure than for the comfort of the rider. Tractors, for example, have for many years been provided with bucket seats made wholly of metal and notwithstanding the recognized superiority of cushioned seats, the latter have been used but little because of their susceptibility to damage and deterioration not only from rain, snow, sun, dust, etc., but also from the alternate wetting and drying which occurs as a result of dew collecting on the parts every night and evaporating during the following day.

The object of the present invention, broadly speaking, is to provide a cover adapted to be placed on the seat when it is unoccupied thereby to shelter it. Not only does such a cover make feasible the cushioned seats which have been impractical in the past, but, used in connection with conventional all-metal seats, it prevents rust and eliminates the possibility of a seat becoming too hot to ride in as a result of being exposed to the direct rays of the mid-day sun.

Another object of the invention is to provide, in connection with a seat cover of the kind indicated, an arrangement for quickly and easily putting the cover in place or removing it from the seat. To this end an important feature of the invention resides in the facilities provided for storing the cover when not in use. Another important feature resides in the arrangement for supporting the cover in such a fashion as to provide for drainage thereof when it is over the seat.

Other objects and features will appear in the course of the following description of the invention.

In the accompanying drawings which form a part of the specification and are to be read in conjunction therewith, and in which like reference numerals are employed to identify the parts of the various views:

Fig. 1 is a plan view of my protective cover applied to the seat of a tractor, parts of the cover having been cut away for purposes of illustration, Fig. 2 is a side elevational view of a tractor seat with the cover applied thereto, part of the cover again being cut away for purposes of illustration, Fig. 3 is an enlarged cross sectional view taken along the line 3—3 of Fig. 2 in the direction of the arrows, Fig. 4 is a horizontal cross section taken along the line 4—4 of Fig. 3 in the direction of the arrows, Fig. 5 is an exploded perspective view of the bracket by which my device is attached to the seat which is to be protected, Fig. 6 is an enlarged cross sectional view taken along the line 6—6 of Fig. 1 in the direction of the arrows, and Fig. 7 is a fragmentary view illustrating a modification in the shape of the end of the bail.

Referring more particularly to the drawings, the reference numeral 10 identifies the outer shell of a tractor seat of the bucket type. Preferably stamped in one piece from sheet metal, the seat is welded or otherwise affixed to a spring support 14. For the rider's comfort the shell is lined with cushioning material or padding 16 over which is disposed a soft cover 18 of waterproof fabric, pliant leather or the like, held in place by the rolled rim 20 of the shell.

From the standpoint of comfort this seat construction obviously is a vast improvement over the conventional all-metal seats and, by reducing operator fatigue, the cushion makes it possible to work or ride for longer periods of time and with greater efficiency than would otherwise be the case.

Naturally a padded seat of the character described has a greater initial cost than an unpadded seat made, for example, from metal; the additional cost being very considerable if high quality padding and covering are employed to obtain maximum comfort. Unfortunately, the materials having the best characteristics from the standpoint of operator comfort are in general the most susceptible to injury and deterioration from the weather, i. e. sun, rain, the dew that forms on the parts over night, etc. Accordingly, it has not been unusual in the past for an operator having a high quality and expensive seat to remove it from the tractor and store it indoors whenever the machine was not in use.

My protective seat cover makes this unnecessary. Broadly, it consists of a waterproof fabric 22 of the shape illustrated, a strip 24 being stitched to the underside thereof in order to form a sleeve, as best seen in Figs. 1 and 6. Through this sleeve is threaded a bail 26 whose ends are hingedly connected to the sides of the seat. The marginal edge of the cover is hemmed and contains an elastic garter-band 28 tending to draw the edges inwardly.

Figs. 3, 4 and 5 illustrate one suitable form of bracket for mounting the ends of the bail on the seat; each bracket comprises an upper member 30 and a lower member 32 clamped on the rim of the seat by a bolt 34 and a nut 36. The upper member has a down-turned flange apertured at 38 to receive the end of the bail. When once affixed to the sides of the seat the brackets preferably are left in place, it being possible however to remove the bail and cover, if desired, by spreading the bail enough to draw the ends out of apertures 38. If the bail is to be left permanently on the seat, its ends are modified as shown at 40 (Fig. 7) to prevent their removal from the apertures in the bracket.

The manner in which the cover is used will be quite obvious. When the seat is not occupied, the cover is arranged as in Figs. 1 and 2, which is to say bail 26 is positioned above the seat forming an upright, arch, or inverted U-shaped member to elevate the center portion of the cover while the garter 28 disposed under the edge of the seat stretches the cover taut and draws the edge of the cover tightly down around the edges of the seat. This will adequately shelter the seat from rain, dew, the direct rays of the sun, etc., and the slope of the cover makes any moisture drain over the edges thereof.

Whenever the seat is to be used, the front edge of the cover is grasped and drawn outwardly and upwardly, stretching the garter band in such a fashion as to peel the cover from the seat. When approximately the forward half of the seat is exposed, the bail 26 is swung rearwardly as indicated by the dotted line in Fig. 2 until it passes downwardly behind the rear edge of the seat. At the same time the cover also is carried over the rear edge of the seat; thus although still attached to the seat, the cover is wholly out of the way, being disposed below the seat's rear rim.

When it is again desired to protect the seat, the bail is swung back up into the position shown and the edges of the cover are drawn down around the edges of the seat. This can be accomplished very quickly and easily.

Although intended primarily for cushioned seats of the type illustrated, it will be obvious that my cover may be used with unpadded seats, being of particular utility in preventing all-metal seats from rusting and from becoming so hot as to be uncomfortable when the unoccupied seat is left standing in the sun.

From the foregoing it will be seen that this invention is one well adapted to attain all the ends and objects hereinbefore set forth together with other advantages which are obvious and which are inherent to the apparatus.

It will be understood that certain features and subcombinations are of utility and may be employed without reference to other features and subcombinations. This is contemplated by and is within the scope of the claims.

Inasmuch as many possible embodiments of the invention may be made without departing from the scope thereof it is to be understood that all material herein set forth or shown in the accompanying drawings is to be interpreted as illustrative and not in a limiting sense.

Having thus described my invention, I claim:

1. In combination with a seat, a cover of flexible material over the seat, said cover conforming in outline with the outline of the seat and having its margin depending around the sides of the seat, a stretched elastic element connected to the margin of the cover so it tends to reduce the perimeter thereof, thereby to draw the cover tightly around the sides of the seat, and an arched member under the cover extending from one side of the seat to the other to hold the central portion of cover elevated above the central portion of the seat.

2. In combination with a seat, a bail having its ends pivoted to the opposite sides of the seat, the bail being of such shape that the center portion thereof may be swung from a position below the edge of the seat upwardly past the seat's edge to an erect position above the seat, and a cover supported by said bail in said last position with its edges covering the edges of the seat.

3. A combination as in claim 2 wherein said cover has an elastic member at its edge drawing same tightly about the edge of the seat.

4. In combination with a seat, an upright mounted on the seat and having its uppermost extremity spaced above the central portion of the seat, a cover of flexible material draped over said support with the edges of the cover depending around the margin of the seat, and means securing the edges of the cover to the margin of the seat.

5. A combination as in claim 4 wherein said last means comprises an elastic garter band secured to the edges of the cover and at least partially encircling the margin of the seat.

6. In combination with a seat, an inverted U-shaped support spanning the seat with the lower ends of its legs connected to opposite sides of the seat and the bight of the U spaced above the top of the seat, a cover of flexible material draped over said support with the edges of the cover depending around the margin of the seat, and means securing the edges of the cover to the margin of the seat.

7. In combination with a seat, a cover over the seat, the outer margin of said cover engaging the outer margin of the seat and the balance of the cover being spaced above the top of the seat to provide an air space between the cover and seat.

8. A combination as in claim 7 wherein the highest point of said cover is substantially at its center and the cover slopes downwardly and outwardly in all directions from the center.

9. A combination as in claim 7 wherein the lower ends of the legs of said U-shaped member are hingedly connected to opposite sides of the seat.

WALTER L. WEAKLEND.

REFERENCES CITED

The following references are of record in the file of this patent:

UNITED STATES PATENTS

| Number | Name | Date |
| --- | --- | --- |
| 1,116,074 | Jones | Nov. 3, 1914 |
| 2,191,956 | Coldren | Feb. 27, 1940 |